Sept. 22, 1964     T. H. PEIRCE, JR     3,149,481
FLEXIBLE COUPLING
Filed March 26, 1962     2 Sheets-Sheet 1
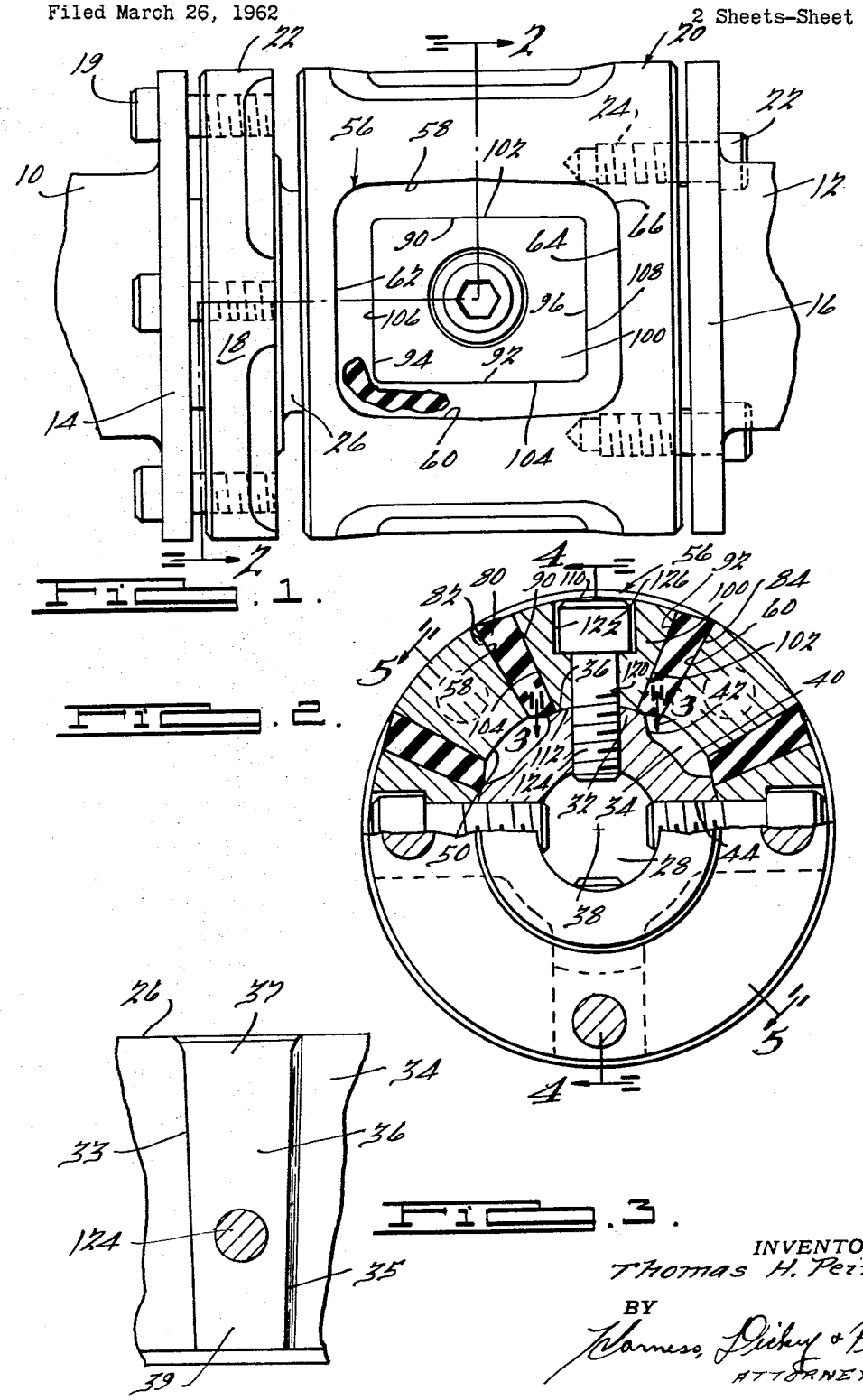
INVENTOR.
Thomas H. Peirce, Jr.
BY
Harness, Dickey & Pierce
ATTORNEYS.

Sept. 22, 1964 T. H. PEIRCE, JR 3,149,481
FLEXIBLE COUPLING
Filed March 26, 1962 2 Sheets-Sheet 2

INVENTOR.
Thomas H. Peirce, Jr.
BY
Harness, Dickey & Pierce
ATTORNEYS.

United States Patent Office 3,149,481
Patented Sept. 22, 1964

3,149,481
FLEXIBLE COUPLING
Thomas H. Peirce, Jr., Detroit, Mich., assignor to H. A. King Company, Inc., a corporation of Michigan
Filed Mar. 26, 1962, Ser. No. 182,219
10 Claims. (Cl. 64—14)

This invention relates to a coupling device, and more particularly to a flexible coupling for connecting shaft members or the like.

It is an object of the present invention to provide a flexible coupling wherein the connected elements are completely insulated from one another by flexible resilient connecting means.

Another object of the present invention is to provide a flexible coupling to connect members in a manner which more satisfactorily accommodates misalignment of the connected members.

Still another object of the present invention is to provide a flexible coupling for movable members which is designed to accommodate thrust and load in all directions during movement thereof.

A further object of the present invention is to provide a flexible coupling having flexible connecting means designed to greatly increase the capacity of the coupling to accommodate coupling loads.

Still a further object of the present invention is to provide a flexible coupling design wherein the flexible connecting means are utilized in a manner to increase the flex-life of the flexible coupling.

The foregoing objects are accomplished, in general, by providing a coupling unit comprising a shaft member and a sleeve member which are telescopically associated. A plurality of substantially rectangular configured, inwardly tapered, slots or holes are formed about the periphery of the sleeve member. Correspondingly configured, substantially rectangular, inwardly tapering, connecting block means are adapted to be securely connected to the shaft member and received within the slots of the sleeve member in a spaced relationship relative thereto whereby the shaft member is completely isolated from direct contact with the sleeve member. Correspondingly configured resilient rubber-like bushing means or sleeves are mounted between the sleeve member and the connecting block means. The design of the resilient rubber-like sleeves provides an effective load transmitting area between the sleeve member and shaft member which is far greater than in previous flexible couplings. In addition, the design of the flexible rubber-like sleeves is such as to provide resilient separating means between the shaft member and the sleeve member in all directions so that all components of force developed on the shaft member or sleeve member in use will be accommodated by some portion of the flexible rubber-like sleeves. The flexible rubber-like sleeves are assembled in a manner providing a preload on the rubber-like material which improves flex-life in use. In addition to providing a flexible coupling device, the subject structure provides a substantially vibration free arrangement wherein vibrant bodies may be connected to one another by means of a relatively non-conducting body in a new and improved manner.

An illustrative embodiment of the present invention from which other objects and advantages will be readily apparent is hereinafter disclosed in detail by reference to the accompanying drawings wherein:

FIGURE 1 is a side elevational view of a flexible coupling embodying the principles of the present invention;

FIGURE 2 is a sectional view taken along the line 2—2 in FIGURE 1;

FIGURE 3 is a partial sectional view taken along the line 3—3 in FIGURE 2;

Figure 4:
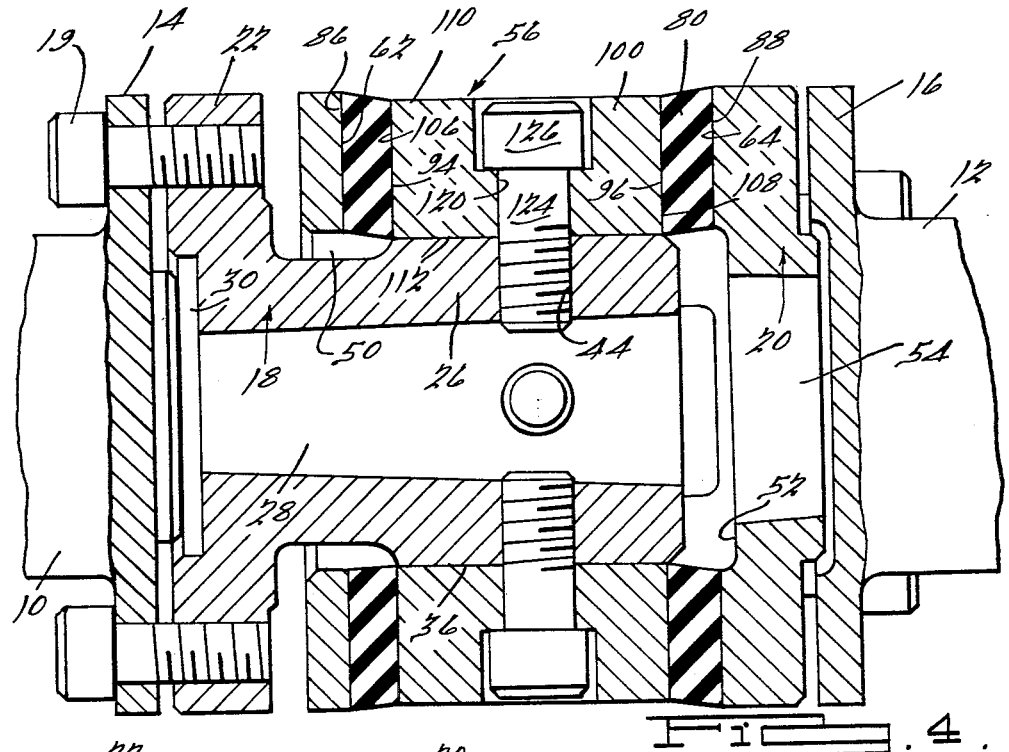
FIGURE 4 is a sectional view taken along the line 4—4 in FIGURE 2.
Figure 5:
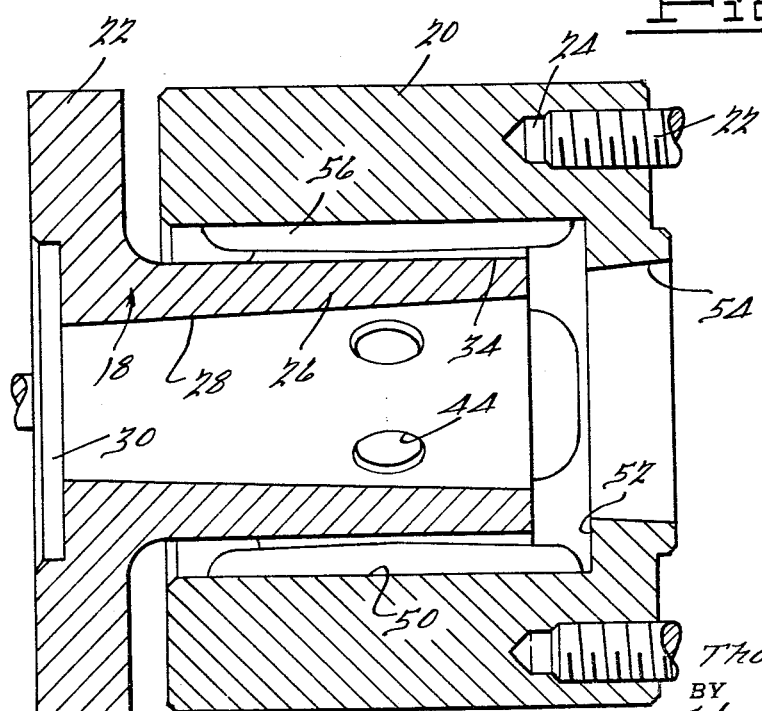
FIGURE 5 is a sectional view taken along the line 5—5 in FIGURE 2.

Referring now to FIG. 1, the subject flexible coupling is designed to connect a pair of rotatable shafts 10, 12, or the like, which may be provided with coupling attaching flanges 14, 16. The shaft 10 is adapted to be fixedly connected to one of the coupling members 18 by means of bolts or the like 19 which are threadably received in a flange 22 at one end thereof. The shaft 12 is fixedly connected to another one of the coupling members 20 by means of bolt members 22 which extend into suitable threaded bores 24 in the end of the coupling member.

Referring now to FIG. 4, the coupling portion of the coupling member 18 to which the present invention is directed is in the form of a shaft means 26 extending transversely from the flange portion 22 and having a central bore 28. The bore 28 terminates at one end in a shaft accommodating recess 30 and tapers outwardly toward the other end. As shown in FIG. 2, a plurality of axially extending lands 32 and grooves 34 are spaced circumferentially about the periphery of the shaft portion 26. The lands 32 are equally spaced around the periphery of the shaft portion and are separated by the equally spaced longitudinally extending grooves 34. The outer surfaces 36 of the lands have a cylindrical curvature with a common center located at the center 38 of the shaft means. As shown in FIG. 3, the land portions 32 have longitudinally tapered side walls 33, 35 which define a maximum width portion 37 at one end and a minimum width portion 39 at the other end. The bottoms of the grooves also have a cylindrical curvature with a common center at 38. The outer surfaces 36 of the lands are connected to the bottoms 40 of the grooves by inwardly inclined surfaces 42. A plurality of threaded bolt receiving bores 44 are provided in the land portions of the shaft means and are centrally located therein.

Referring again to FIG. 4, the sleeve means 20 is provided with a central bore 50 which terminates in a transverse shoulder 52 formed by a concentric bore 54 of smaller diameter. The diameter of the bore 50 is approximately equal to the diameter of the shaft portion 26 as measured across a pair of the oppositely located lands 32. Consequently, the shaft portion 26 may be slidably inserted in the bore 50. The sleeve member 20 is provided with a plurality of circumferentially spaced pocket means 56 in the form of slots having longitudinally extending side walls 58, 60 and transversely extending side walls 62, 64, as shown in FIG. 1. The pockets 56 have a substantially rectangular peripheral configuration and are equally spaced around the periphery of the sleeve member 20. As shown in FIG. 2, the longitudinally extending side walls 58, 60 of the pockets are inwardly tapered and, as shown in FIG. 4, the transverse side walls 62, 64 are substantially straight and extend radially relative to the central longitudinal axis of the assembly. The longitudinally extending side walls 58, 60 and the transverse side walls 62, 64 are connected by curved corner portions 66.

Resilient separating means in the form of rubber or rubber-like sleeves 80 are provided to connect the sleeve member 20 to the shaft member 18. As seen in FIG. 1, the rubber sleeve elements have a substantially rectangular peripheral configuration substantially corresponding to the peripheral configuration of the pockets 56. The resilient means have inwardly tapered, longitudinally extending, outer walls 82, 84 and transversely extending side walls 86, 88, shown in FIG. 2. Each of the rubber sleeve means is provided with a central pocket portion having a substantially rectangular peripheral configuration defined by longitudinally extending inwardly tapered side walls 90, 92 and transversely extending side walls 94, 96. The taper of the inner side walls 90, 92 is different than the taper of the outer side walls 82, 84 and the taper of the outer side walls 82, 84 substantially corresponds to the taper of the side walls 58, 60 of the pocket 56 in the sleeve member 20.

Wedging means in the form of block members 100 are provided to secure the shaft member 18 to the sleeve member 20 through the resilient rubber sleeves 80. Each of the wedging means 100 comprises a block having a substantially rectangular peripheral configuration, as seen in FIG. 1, and longitudinally extending, inwardly tapered, side walls 102, 104 connected by transversely extending side walls 106, 108. The block is further provided with outer and inner surfaces 110, 112 having cylindrical curvatures with common centers at 38. The inner surface 112 substantially corresponds to the surface 36 of the land 32. A bolt bore 120 is centrally located in the block and includes an enlarged counterbore 122 for reception of bolt means 124 having a socket head 126. As shown in FIG. 1, the resilient rubber sleeve means, the pocket in the resilient rubber sleeve, and the wedging means have substantially corresponding relative dimensions and configurations so that in the assembled position the bolt hole 120 will be substantially aligned with the threaded bore 44 in the shaft portion 18.

In assembling the flexible coupling, the shaft portion 18 is slidably inserted into the central bore 50 of the sleeve member 20 and aligned therein with the lands 32 centrally positioned within the pocket portions 56 of the sleeve and with the grooves 34 centrally positioned relative to the surfaces of the bore 50. The resilient mounting means in the form of the rubber sleeves 80 are mounted in each of the pockets 56. In the preferred form of the invention, the outer side walls of the sleeves 82, 84, 86, 88 are bonded to the side walls 58, 60, 62, 64 of the pockets 56. The wedging means are thereafter inserted within the pockets in the resilient rubber sleeves and the bolts 124 are threadably inserted into the threaded bores 44 until the inner cylindrical surfaces 112 of the blocks are brought into engagement with the cylindrical surfaces 36 of the lands 32. Since the cylinder surfaces have a substantially common radius, the surfaces will intimately engage one another. The size of the block is somewhat greater than the size of the pocket formed in the rubber sleeve so that there will be a frictional gripping engagement between the side surfaces of the block and the side surfaces of the pocket. However, during the initial assembly before the bolts 124 have been tightened, the relative dimensions of the block and the pockets in the resilient sleeve are such that a negligible compression of the rubber sleeve exists. As the bolt 124 is threaded into engagement with the shaft portion 18, the wedging block is drawn into the pockets and frictionally engages and inwardly displaces the adjacent surfaces of the sleeve pocket therewith. Since the outer surfaces of the rubber sleeves have been bonded to the coupling member 20, the rubber sleeves are extended and tensioned in a diagonal direction toward the center of the coupling. In this manner, a preload is created on the rubber sleeve which will greatly increase the flex-life of the rubber sleeve and the flexible coupling with regard to the application of torque through the coupling which will tend to compress the rubber sleeves.

In operation, with rotational movement of one of the shafts being transmitted to the other shaft through the flexible coupling, the wedging block means will be slightly rotatably displaced toward one of the side walls of each of the pockets 56 in the sleeve member 20 in the direction of rotation. The rubber sleeve will be compacted and the rotative force or torque will be transmitted through the rubber sleeve from one coupling element to the other. The tension preload on the rubber sleeve tends to counteract the compacting forces exerted by the wedging means in use and increases the flex-life of the rubber sleeve. The wedging means are completely insulated from the sleeve member 20 and therefore the coupling is universally flexible in response to any set of force conditions tending to cause relative displacement of the connected shafts in any direction. Furthermore, the connected shafts are completely vibrationally insulated from one another and therefore vibration transmission through the shafts is greatly reduced.

It is contemplated that the principles disclosed herein are applicable to flexible couplings in a generic sense and that other flexible couplings embodying those principles may subsequently be designed by those skilled in the art to which the invention relates. Consequently, it is intended that modifications of the disclosed illustrative embodiment which utilize the principles of the invention are to be included within the scope of the appended claims except insofar as limited by the prior art.

What is claimed is:

1. In a flexible coupling for connecting shaft members or the like, shaft means adapted to be connected to one of said members, sleeve means adapted to be connected to the other of said members and having a central bore adapted to receive said shaft means, the outer peripheral diameter of said shaft means being substantially equal to the inner peripheral diameter of said central bore, said shaft means having a plurality of spaced lands and grooves provided around the periphery thereof, a plurality of pocket means formed in said sleeve means and having a position overlying said lands when said shaft means is located in said bore of said sleeve means, said groove means being located in said position to provide a gap between said shaft means and said sleeve means whereby all direct surface engagement between said shaft means and said sleeve means is eliminated, resilient means adapted to be received in said pocket means in said sleeve means, each of said resilient means having a central pocket, wedging tapered block means adapted to be received within said central pocket of said resilient means, a mating surface for said spaced lands formed on said wedging means, and fastening means to secure said wedging means to said spaced lands of said shaft means and secure said resilient means in engagement with said sleeve member for transmission of motion therethrough between said shaft members.

2. The invention as defined in claim 1 and wherein said pocket means have a rectangular peripheral configuration, said resilient means having a rectangular configuration substantially corresponding to the rectangular configuration of said pocket means, said central pocket of said resilient means having a rectangular configuration, and said wedging means having a rectangular configuration substantially corresponding to the rectangular configuration of said central pocket of said resilient means and being receivable therein to couple said shaft means to said sleeve means, the rectangular configurations including tapered wall portions enabling said resilient means to be radially inwardly displaced by wedging action of said wedging means.

3. The invention as defined in claim 2 and wherein the longitudinally extending side surfaces of said pocket means, said resilient means, and said wedge means are inwardly tapered to pretension said resilient means in the assembled position.

4. The apparatus as defined in claim 1 and wherein said resilient means surrounds said wedging means so that all of said sleeve means is isolated from said shaft means and said wedging means to compensate and accommodate any misalignment of said shaft members being connected.

5. The invention as defined in claim 3 and wherein said resilient means comprises a rubber-like sleeve bonded to said sleeve member to pretension said resilient means during assembly of said wedging means to said shaft member.

6. A coupling comprising connectable members, one of said members comprising an annulus having a central bore, a plurality of wedge-shaped slots circumferentially spaced about said annulus and extending therethrough, said slots having tapered side walls and tapering inwardly from an opening of maximum dimensions at the outer periphery of said annulus to an opening of minimum dimensions at the inner periphery of said annulus, another of said members comprising a shaft portion adapted to be received within the central bore of said annulus, wedge-shaped connecting block means adapted to be received within said slots, said block means having an outline substantially corresponding to the outline of said slots and having smaller peripheral dimension so that said block means is receivable within said slots in complete peripherally spaced relationship thereto to define a peripheral groove extending therearound and therebetween, resilient spacing means dimensioned to fit in said groove between said connecting block means and said annulus, and fastening means to secure said connecting block means to said shaft portion and secure said resilient spacing means within said groove by movement relative to said slots and said resilient spacing means causing movement of portions of said resilient spacing means radially inwardly relative to said slots to create a pre-load tension in said resilient spacing means whereby movement of one member may be imparted to the other member through said resilient spacing means by an initial change under rotative loads transferred through the coupling from a tensioned condition toward an unstressed condition.

7. Coupling means to secure one movable member to another movable member and comprising a series of wedge-shaped slots provided in one of said members and extending therethrough, wedge-shaped connecting means adapted to be loosely received within said wedge-shaped slots, resilient sleeve means adapted to surround said wedge-shaped connecting means, bonding means to secure said resilient sleeve means within said slots, said wedge shaped connecting means being slidably movable relative to said resilient sleeve means during assembly and engageable therewith to displace portions of said resilient sleeve means within said slots and elongate portions of said resilient sleeve means, and be held between said wedge means and said wedge-shaped slots, and fastening means to secure said wedge-shaped connecting means to said other movable member whereby said resilient sleeve means connects said one movable member to said other movable member and forms a resilient connection therebetween through which movement of one member will be imparted to the other member, said fastening means being adapted to cause movement of said portions of said resilient sleeve means during assembly to create a condition of tension therein during unloaded conditions of said coupling means.

8. The invention as defined in claim 7 and including spacing means completely insulating said one member from the other member so that all peripheral engagement therebetween is eliminated and said resilient connecting sleeve forms the only connection therebetween.

9. A resilient coupling for joining a pair of rotatable members, a connecting annulus having a central bore defining inner and outer surfaces, a plurality of slots formed in said annulus and being spaced circumferentially thereabout, each of said slots being defined by tapered side surfaces terminating in substantially rectangular openings at the inner and outer cylindrical surfaces of said annulus, said inner rectangular opening being smaller than said outer rectangular opening, connecting shaft means having a diameter adapted to fit within said central bore of said annulus, said connecting shaft means having a series of radially inwardly extending grooves extending longitudinally along the outer periphery thereof and defining a series of circumferentially spaced lands therebetween, wedge-shaped block means having tapered side surfaces terminating in an inner bottom surface and an outer top surface, said top surface having larger peripheral dimensions than said bottom surface, said top surface and said bottom surface having peripheral dimensions smaller than said inner rectangular opening and said outer rectangular opening in said annulus, said wedge-shaped block means being loosely receivable within said slot means with the side walls thereof spaced from the side surfaces of said annulus to define a peripheral slot extending therearound, the difference in peripheral dimension between the upper surface of said block means and the outer rectangular opening being less than the relative difference in peripheral dimensions between the lower surface of said block means and the inner rectangular openings so that said peripheral slot tapers inwardly from an outer opening to an inner opening and said outer opening being larger than said inner opening, resilient sleeve means having a configuration similar to said peripheral slot, said sleeve means being adapted to fill said peripheral slot and be tensioned therewithin by said block means, and fastening means to secure said block means to the lands on said shaft means and thereby tension said sleeve means in said peripheral slot, said lands being located completely within the confines of said slots in said annulus and the inner surfaces of said central bore being located completely within the confines of said grooves in said shaft means whereby said annulus is connected to said shaft means only through said resilient sleeve means.

10. A coupling device for rotatably connected members comprising: a plurality of rectangular slots formed in one of said members, opposite walls of said slots extending radially inwardly to form inwardly tapered surfaces, said opposite walls extending substantially parallel to the axis of rotation of said members to form reaction surfaces through which rotational loads are transmitted through said members, resilient means extending parallel to said opposite walls and separating said members, means to fixedly secure said resilient means against said walls, and means connecting said resilient means to the other of said members for transfer of rotational loads between said members through said resilient means, said resilient means being stressed in tension relative to said opposite walls.

References Cited in the file of this patent

UNITED STATES PATENTS

| | | |
|---|---|---|
| 1,820,750 | Lord | Aug. 25, 1931 |
| 1,860,744 | Krotee | May 31, 1932 |
| 2,181,183 | Guy | Nov. 28, 1939 |
| 2,475,647 | Dodge | Dec. 28, 1948 |
| 2,486,885 | Santon | Nov. 1, 1949 |
| 2,550,517 | Bales | Apr. 24, 1951 |
| 2,588,158 | Peirce | Mar. 4, 1952 |
| 2,628,416 | Sampson | Feb. 17, 1953 |
| 2,802,353 | Peirce | Aug. 13, 1957 |
| 2,975,621 | Moulton et al. | Mar. 21, 1961 |
| 3,084,524 | McLay | Apr. 19, 1963 |

UNITED STATES PATENT OFFICE
CERTIFICATE OF CORRECTION

Patent No. 3,149,481 September 22, 1964

Thomas H. Peirce, Jr.

It is hereby certified that error appears in the above numbered patent requiring correction and that the said Letters Patent should read as corrected below.

Column 4, line 39, strike out "wedging", and insert the same after "block" in line 39, same column 4; column 6, line 61, for "2,475,647" read -- 2,457,647 --.

Signed and sealed this 19th day of January 1965.

(SEAL)
Attest:

ERNEST W. SWIDER
Attesting Officer

EDWARD J. BRENNER
Commissioner of Patents